Feb. 5, 1952  S. P. G. HÖGLUND  2,584,449
END MILL CUTTER
Filed Sept. 10, 1947
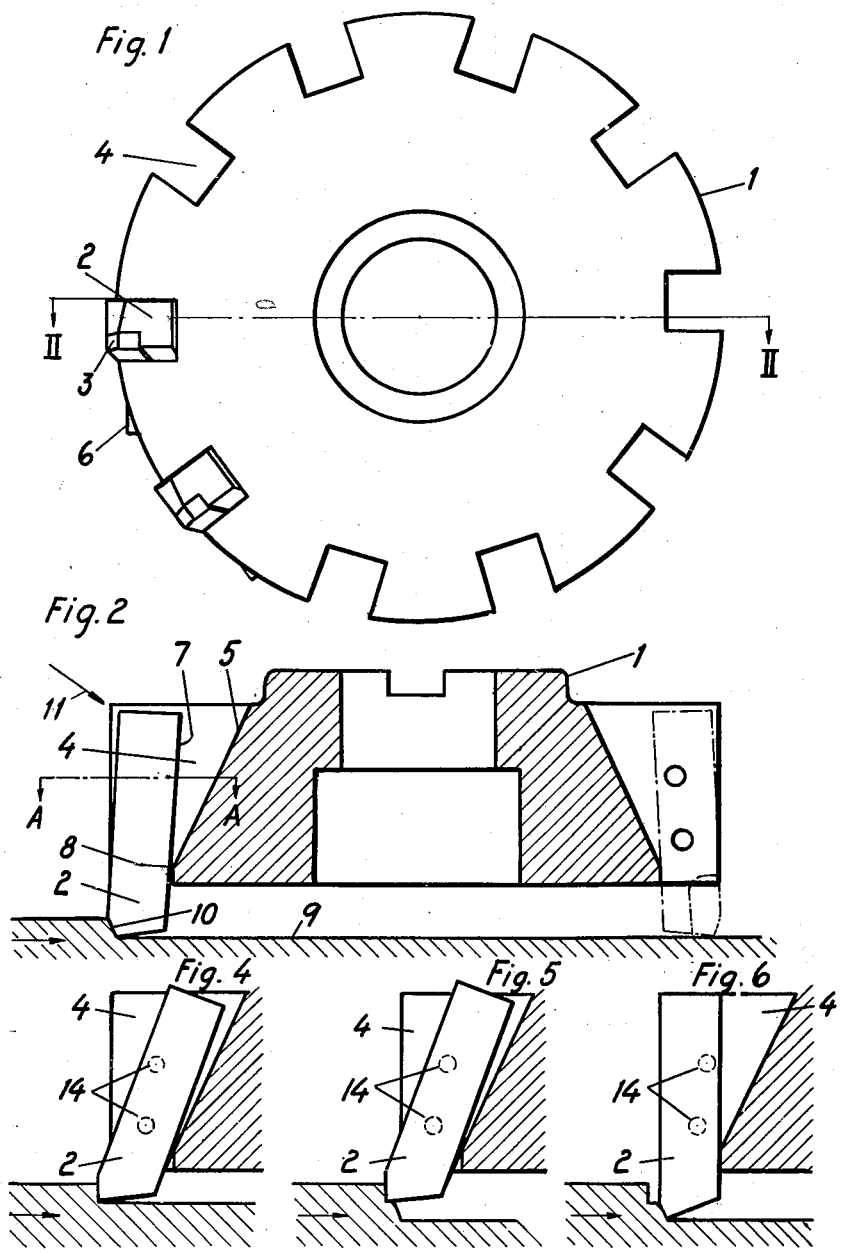
Inventor
Stig Per Gustav Höglund
by Sommers & Young
Attorneys Feb. 5, 1952     S. P. G. HÖGLUND     2,584,449
END MILL CUTTER
Filed Sept. 10, 1947     3 Sheets—Sheet 2
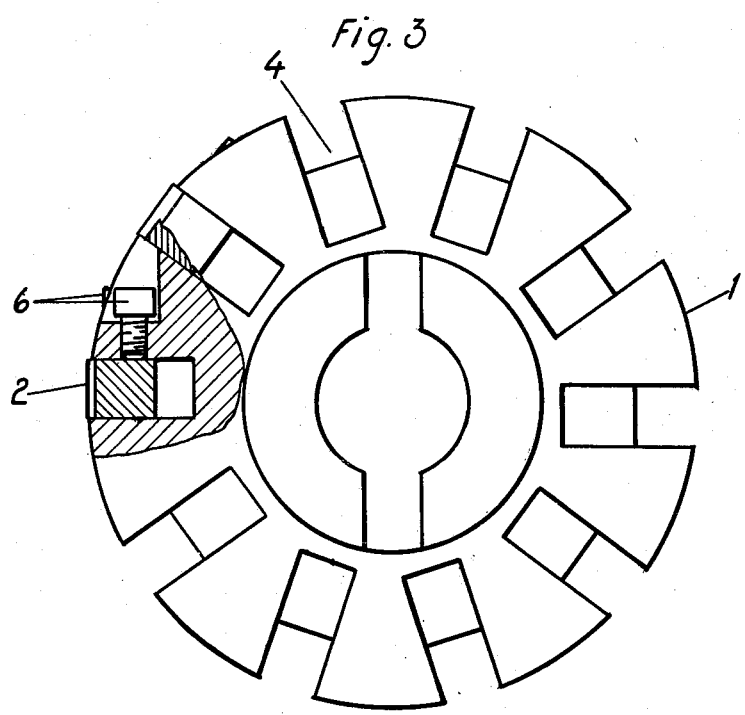
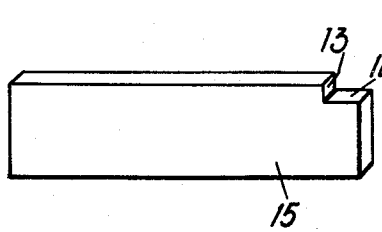
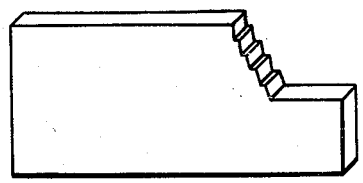

Feb. 5, 1952 — S. P. G. HÖGLUND — 2,584,449
END MILL CUTTER
Filed Sept. 10, 1947
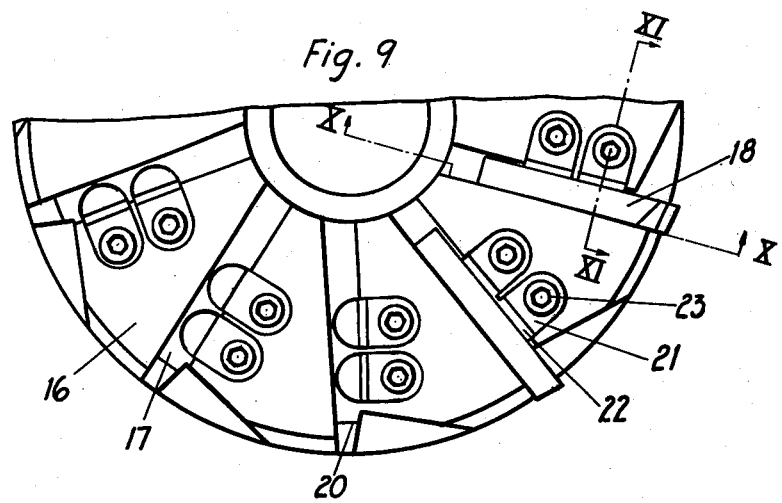
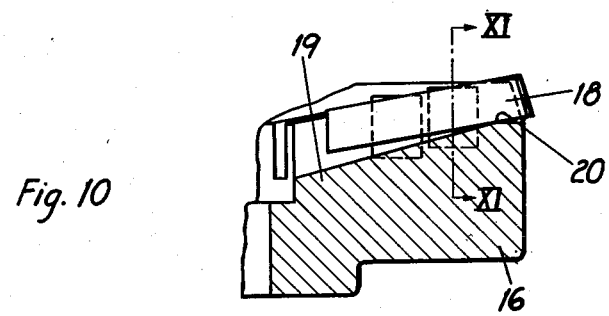
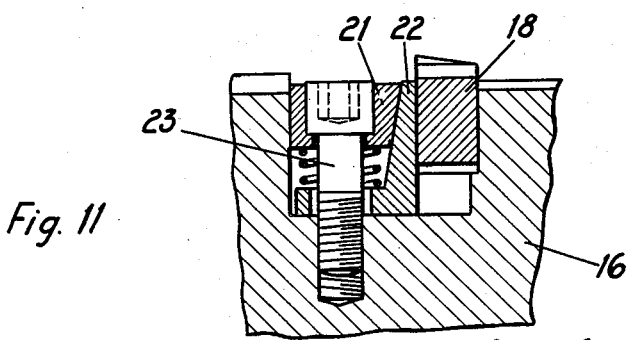

Patented Feb. 5, 1952

2,584,449

UNITED STATES PATENT OFFICE 2,584,449

END MILL CUTTER

Stig Per Gustav Höglund, Sandviken, Sweden, assignor to Sandvikens Jernverks Aktiebolag, Sandviken, Sweden Application September 10, 1947, Serial No. 773,096
In Sweden October 4, 1946

5 Claims. (Cl. 29—105)

The present invention relates to end milling cutters of the type comprising a cutter body having a plurality of circumferentially spaced grooves, cutting tools or blades detachably mounted in said grooves, and means for clamping each of said cutting tools against one side wall of the groove. The grooves may be provided in the peripheral surface of the cutter body, in which case they have substantially axial direction, or in the front face of the cutter body, in which case they have substantially radial direction. Milling cutters of both of these types, particularly with tools having hard metal inserts, are now increasingly popular on account of their high production capacity and the good finish of the surface milled.

It is an object of the invention to provide an improved cutter assembly of the type indicated facilitating the axial and radial adjustment of the tools required in connexion with the first assembling of the cutter or in connexion with subsequent replacements of defective tools etc.

Another object of the invention is to provide an improved method of adjusting the positions of the cutting tools in a cutter of the type indicated.

Other objects of the invention will be apparent from the following description in connection with the accompanying drawing, in which Fig. 1 is a front view of an end milling cutter embodying the invention, with substantially axial cutting tools, Fig. 2 is a section taken on the line II—II of Fig. 1, Fig. 3 is a back end view of the cutter according to Figs. 1 and 2, partly in section along the line A—A of Fig. 2, Figs. 4 to 6, inclusive, are fragmentary sectional views corresponding to the left portion of Fig. 2 and showing a cutting tool clamped in different positions, Fig. 7 is a perspective view of a fixture for the setting or adjusting of the tools of a plain end milling cutter according to the invention, Fig. 8 is a perspective view of a fixture for the setting of the tools of a step milling cutter assembly, Fig. 9 is a fragmentary front view of another example of an end (or side) milling cutter according to the invention with substantially radial cutting tools, Fig. 10 is a section taken on the line X—X of Fig. 9 and Fig. 11 is an enlarged section taken on the line X—X of Fig. 10.

The end milling cutter shown in Figs. 1 to 3 comprises a substantially cylindrical body 1 and a number of detachable cutting tools 2 having the shape of rods which are rectangular in cross-section. The cutter body is designed for ten cutting tools, only two of which are shown in position. The cutting end, or head, of the tools is provided with an inserted cutting portion 3 of hard metal, for instance a sintered carbide alloy. Each of the tools is mounted in an axial groove 4 in the cutter body and held rigidly in position by means of a pair of clamping screws 6. The bottom of the grooves is inclined inwards from the front of the cutter body, so that the depth of the grooves increases towards the rear of the cutter. According to the invention, the inner face 7 of the tool, that is, the one facing the bottom 5 of the groove, is fulcrumed on the cutter body at a point near the front end, or head, of the tool, while the rear end of the tool is spaced away from the bottom of the groove. In the present embodiment, the fulcrum is provided by the blunt edge 8 at the forward termination of the inclined portion of the bottom 5. The described mounting of the tools in the cutter body provides a rigid support for the tools while at the same time allowing of a simple and efficient method of adjusting the positions of the tool, as explained in detail below with reference to Fig. 2.

It is assumed that one of the tools of the cutter assembly is damaged while the cutter is engaged in milling a surface 9 of a workpiece. The following procedure may then be used for replacing the damaged tool. The cutter is allowed to operate upon the workpiece a short time while the workpiece is held stationary (feed motion shut off), so that a circular shoulder 10 is formed. The damaged cutting tool is then removed (in case it has not been removed already before the cutting of said circular shoulder) and replaced by another cutting tool the cutting edges of which have been previously ground to the correct shape. After the tool has been placed in an approximately correct position in the cutter body with its tip near the convex corner or angle at the base of the shoulder 10, the correct position is ensured simply by exerting a slight pressure upon the rear extremity of the tool in the approximate direction of the arrow 11. Said pressure will cause the tool to turn about the fulcrum formed by the blunt edge 8 so as to force the side cutting edge of the tool towards the shoulder 10 and the end cutting edge of the tool towards the milled surface 9 of the workpiece. The expressions "side cutting edge" and "end cutting edge" are here used to designate the cutting edges extending substantially in the longitudinal direction of the tool and transversely of said direction, respectively.

When assembling a new cutter or replacing the entire set of tools of a cutter, the following procedure may according to the invention be used. The cutter body is mounted on the arbor of a milling machine, and a cutting tool is clamped in one of the grooves in such position that the side of the tool facing the bottom of the groove engages the cutter body at the edge 8. The cutting tool may of course be placed in position before the mounting of the cutter body in the milling machine. Said tool is then used for cutting a shoulder in a stationary workpiece attached to the work table of the milling machine. Said shoulder is then used for the adjustment of the remaining tools in a manner quite similar to the one described in the preceding paragraph.

In carrying out the method according to the invention it is possible to use a specially prepared fixture instead of a workpiece. Fig. 7 shows by way of example a fixture shaped as a plate 15 one edge of which has an indentation the sides 12, 13 of which will serve as abutments for the end cutting edge and the side cutting edge of the tool, respectively. Such a fixture may be used either in connexion with a milling machine, in which case the cutter body is mounted on the arbor of the machine and the fixture is clamped to the work table of the machine, or in connexion with a stud or the like for supporting the cutter body, the fixture being attached to said assembling device in a predetermined position with regard to said stud corresponding to the desired position of the cutting tools.

The cutter assembly shown in Figs. 1 to 3 may be modified into a right-angle milling cutter (that is, an end milling cutter for shaping a plane surface at right angles to the axis of rotation of the cutter and at the same time another plane surface or shoulder at right angles to said first-mentioned surface) or into a step milling cutter by changing the positions of the cutting tools or blades. Fig. 4 shows the position of the cutting tools 2 as adapted to right-angle milling. Figs. 5 and 6 show the positions of the tools 2 as adapted for two-step milling, the tools being set alternately according to Fig. 5 and Fig. 6. The circles 14 in Figs. 4 to 6 indicate the positions of the clamping screws 6. In a similar manner, the cutter may also be adapted for three-step milling (in which case one of the grooves is left vacant), four-step milling (in which case two diametrically opposed grooves are left vacant), five-step milling or ten-step milling.

The adjustment of the individual cutting tools of a step milling cutter is carried out in the same manner as above explained in connexion with an ordinary end milling cutter, the fixture used being provided with a number of shoulders or indentations corresponding to the number of steps desired. Fig. 8 shows by way of example a tool adjusting fixture for a five-step cutter.

As apparent from Figs. 5 and 6, the bevel angle, that is, the angle between the side cutting edge and the axis of the cutter body, of the tools set at one level will be different from the bevel angle of the tools set at the other level. In most cases said difference will not cause any disadvantage. It is possible, however, to modify the construction of a step milling cutter according to the invention in such manner that the bevel angles will be equal for all of the tools. To that end the grooves for the tools corresponding to the various steps may be made with different depths, the difference equalling the difference between the radii of the paths of the lips of the tools mounted in said grooves. The inclinations of the tools with regard to the tool axis and, consequently, the bevel angles will then be equal for all of the tools. Obviously, this feature will be obtained for a predetermined number of steps only.

It is to be noted that the advantageous method of adjustment described in connexion with Fig. 2 does call for a definite constructional feature of the cutter, viz. that the cutting tools, grooves and clamping screws must be so shaped and arranged that the inclination of the cutting tools with regard to the axis of the cutter body may be chosen at will within a certain angular range which is preferably not smaller than about ten degrees. In the cutter shown in Figs. 1 to 3 said range is about twenty-five degrees.

The embodiment of the invention shown in Figs. 9 to 11, inclusive, comprises a cutter body 16 the front face of which (that is, the side facing the workpiece) has ten radial grooves 17 for the cutting tools or blades 18, only two of which are shown in position. The bottom 19 of the grooves is inclined backwards and inwards from the periphery of the cutter body, apart from a short portion adjoining the periphery of the cutter body. The blades are mounted in such positions that their backside, that is, the side facing the bottom of the grooves, engages the cutter body at the blunt edge 20 only formed at the outer end of the sloping part of the bottom of the grooves. Each blade is held in position by two identically similar clamping devices each of which comprises two wedges 21, 22 and a screw 23 operating the wedge 21. The manner in which the tools or blades are set to correct positions need not be described, as it is quite analogous to the manner of adjustment described in connexion with Figs. 1 to 3.

In the cutter which has been described above for the purpose of exemplifying the invention, the cutting blades are directed substantially axially (Figs. 1 to 3) or substantially radially (Figs. 9 to 10). The invention is, however, applicable also to milling cutters in which the cutting tools are inclined, for instance, about 45 degrees towards the cutter axis. Various other modifications of the cutters above described and of the methods of setting the tools of the same may be made without departing from the spirit of the invention as defined in the appended claims.

I claim:

1. An end milling cutter of the type comprising a cutter body having a plurality of circumferentially spaced grooves, cutting tools mounted in said grooves, and means for clamping each of said cutting tools against only one side wall of the groove, the side of the tool facing the bottom of the groove resting on the cutter body at one point only near the front end, or head, of the tool, while the rear end of the tool is spaced away from the bottom of the groove, the tip of the tool thus being adjustable radially as well as axially in relation to the cutter axis.

2. An end milling cutter of the type comprising a cutter body having a plurality of circumferentially spaced grooves, cutting tools mounted in said grooves and means for clamping each of said cutting tools against only one side wall of the groove, said tools being mounted in such position that each tool engages the bottom of its groove at the front end of the groove only, the tip of the tool thus being adjustable radially as well as axially in relation to the cutter axis.

3. An end milling cutter of the type comprising a cutter body having a plurality of circumferentially spaced grooves, cutting tools mounted in said grooves and means for clamping each of the cutting tools against only one side wall of the groove, said tools being mounted in such position that each tool engages the bottom of its groove at the front end of the groove only, said grooves, cutting tools, and clamping means being so shaped and arranged that the cutting tools may be clamped in any desired angular relation to the cutter axis within an angular range of at least twenty-five degrees.

4. An end milling cutter of the type comprising a cutter body having a plurality of circumferentially spaced and substantially axial grooves having a depth increasing backwards from the front face of the cutter body, cutting tools mounted in said grooves and means for clamping each of the cutting tools against only one side wall of the groove, the tools being mounted in such position that each tool engages the bottom of its groove at the front end of the groove only, the tip of the tool thus being adjustable axially as well as radially in relation to the cutter axis.

5. An end milling cutter of the type comprising a cutter body the front face of which has a plurality of circumferentially spaced substantially radial grooves having a depth increasing inwards from the periphery of the cutter body, cutting tools mounted in each of said grooves and means for clamping each of the cutting tools against only one side wall of the groove, the tools being mounted in such position that each tool engages the bottom of its groove at the outer end of the groove only, the tip of the tool thus being adjustable radially as well as axially in relation to the cutter axis.

STIG PER GUSTAV HÖGLUND.

REFERENCES CITED

The following references are of record in the file of this patent:

UNITED STATES PATENTS

| Number | Name | Date |
|---|---|---|
| 739,750 | Warburton | Sept. 22, 1903 |
| 1,898,051 | Head | Feb. 21, 1933 |
| 2,033,384 | Marshall | Mar. 10, 1936 |

FOREIGN PATENTS

| Number | Country | Date |
|---|---|---|
| 266,760 | Germany | Oct. 30, 1913 |
| 514,462 | Germany | Dec. 16, 1930 |